INVENTORS
MICHAEL A.K. HAMID
ROGER J. BOULANGER
By J.R. Hughes
AGENT

United States Patent Office 3,611,582
Patented Oct. 12, 1971

3,611,582
MICROWAVE PACKAGE FOR CONTROL OF MOISTURE CONTENT AND INSECT INFESTATIONS OF GRAIN
Michael A. Hamid and Roger J. Boulanger, Winnipeg, Manitoba, Canada, assignors to Canadian Patents and Development Limited, Ottawa, Ontario, Canada
Filed Nov. 7, 1969, Ser. No. 874,784
Int. Cl. B01k 5/00
U.S. Cl. 34—1                                                                6 Claims

ABSTRACT OF THE DISCLOSURE

A vegetal substance, for example, wheat, is deinfested by passing the wheat as a filling along a main section waveguide, whilst microwave energy is generated along a branch section waveguide into the wheat. The microwave energy from a magnetron passes along a screw tuner and slotted line, both of which form the branch section and are used to adjust the voltage standing wave ratio to a minimum. Warm air may be passed along a main section waveguide to dry the wheat.

---

This invention relates to apparatus for the deinfestation of vegetal substances.

The drying of vegetal substances such as cereal crops, and the control of insect infestations in storage and transportation units are essential to maintain food quality. Hitherto high powered blowers of hot, dry air have been used for this purpose and these have proved to be costly and inadequate. Hot air blowers have been found to solely reduce the moisture content of the exterior kernel layers and to produce a rather non-uniform heat distribution within the total grain volume. For this reason hot air blowers have not been capable of wholly destroying infestation throughout grain, that is destroying insect, mite, smutt and larvae infestations inside or outside of the kernels, and this is of utmost importance for long term storage.

It is an object of the present invention to provide an apparatus which will destroy infestations throughout vegetal substances.

According to the invention there is provided an apparatus for the deinfestation of vegetal substances, comprising a main section waveguide, means for passing said substance along said main section as a filling therein, a main section waveguide, a branch section waveguide joined to said main section to form a junction therewith, a window partitioning the interior of said branch section from said main section to provide a passage through the interior of said main section for said substance, said window providing a substantially unobstructed path for microwave energy propagated along said branch section and into said main section, and means for generating microwave energy along said branch section and into said main section to heat said substance, when it is disposed within said main section, to destroy infestation within said substance.

By using microwave energy discrete particles of a vegetal substance such as, for example, grain kernels are almost uniformly heated throughout and so it is a further object of the invention to provide, in some instances, an apparatus for the deinfestation of and removal of moisture from discrete particles of vegetal substances.

It is known that storage difficulties and infestation of, for example, wheat grain occur most frequently when the wheat grain has a high moisture content.

It is a further object of the invention to provide an apparatus for the deinfestation and removal of moisture from vegetal substances.

Thus the apparatus of the invention defined above may also include means for passing a dried gas, heated to at least 45° C., through the said heated substance to remove moisture therefrom.

Figure 1:
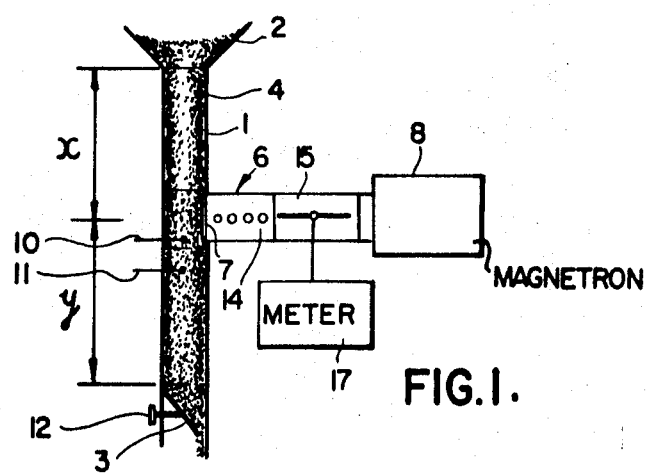
Figure 2:
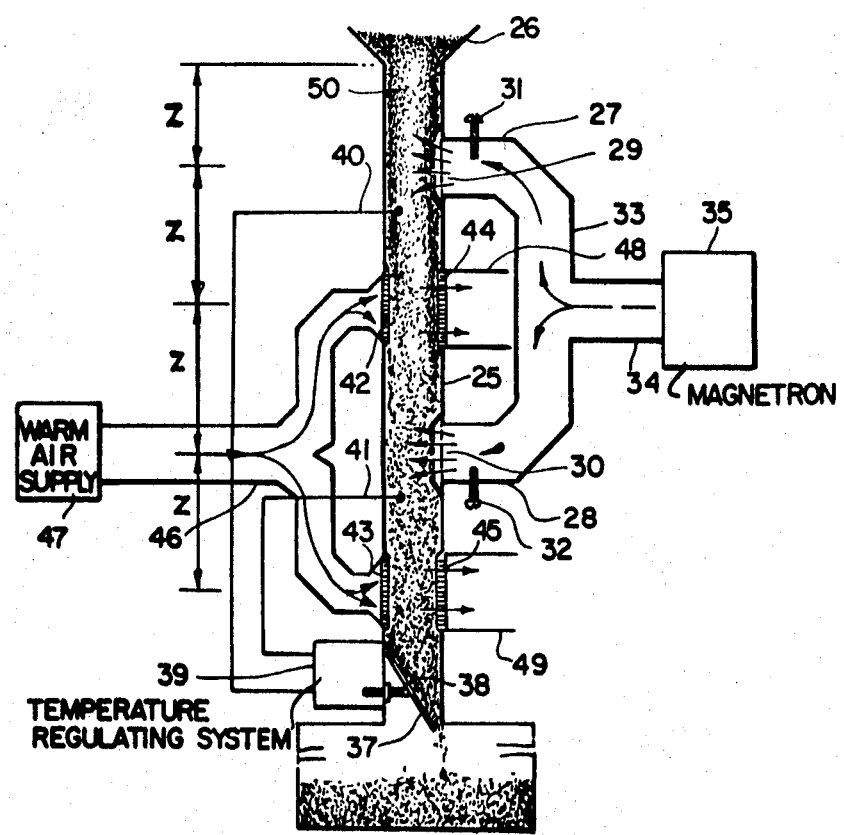

In the accompanying drawings which illustrate, by way of example, embodiments of the invention, FIG. 1 is a diagrammatic side view of an apparatus for the deinfestation of wheat grain, FIG. 2 is a diagrammatic side view of an apparatus for the deinfestation of wheat grain having two-stage drying for the wheat grain.

In FIG. 1 there is shown a main section waveguide 1, a means, in the form of a hopper 2 and flap valve 3, for passing wheat grain 4 along the main section as a filling therein, a branch section waveguide 6 joined to the main section 1 to form a junction therewith, a window 7, of plastic material, partitioning the interior of the branch section 6 from the main section 1 to provide a passage through the interior of the main section 1 for the wheat 4, the window 7 providing a substantially unobstructed path for microwave energy propagated along the branch section 6 and into the main section 1, and means, in the form of a magnetron 8, for generating at least 1.00 kw. seconds of microwave energy along the branch section 6 and into the main section 1 to heat the wheat 4 within the main section 1, to destroy infestation within the wheat 4.

The dimensions $x$ and $y$ of the main section 1 are both 36 inches, and two thermocouples 10 and 11 were fitted to the main section 1 to measure the temperature of the wheat 1 therein. The flap valve 3 is provided with a screw adjustment 12 for adjusting the opening of the flap valve 3.

The branch section 6 is composed of a screw tuner 14, a slotted line 15, and a voltage standing wave ratio meter 17. The slotted line 15 is connected to the magnetron 8, which has an available power output of 1.2 kw. at 2.45 gHz.

In operation the hopper 2 and main section 1 are filled with wheat grain 4 as shown in FIG. 1. The flap valve 3 is adjusted to ensure an even distribution of wheat grain 4 gravitating down the main section 1 and the magnetron 8 is energized. The reading on the voltage standing wave ratio meter 17 is observed, the screw tuner 6 is adjusted to tune the apparatus so that the voltage standing wave ratio observed in the slotted line 15 is the minimum obtainable and indicates that maximum absorption of microwave energy by the wheat grain 4 in the main section 1 is obtained. The temperature of the wheat grain 4 at the positions of the thermocouples 10 and 11 were noted and the flow of the wheat grain 4 through the main section 1 was adjusted by the flap valve 3 to ensure that residual heat generated in the wheat grain 4, by the microwave energy, was retained therein for a sufficient length of time for deinfestation of the wheat grain 4.

The destruction of insects within the wheat is probably due largely to selective dielectric heating. Tests were carried out by scattering samples of insects in small plastic containers filled with wheat grain, and the containers were then passed down the main section 1. Complete destruction of cockroaches was observed at 55° C. because of the high moisture content of these insects relative to the moisture content of the wheat grain. For adult *Tribolium confusum*, 70% mortality was obtained at 55° C. and 100% mortality was obtained at 65° C. In all cases the test samples were maintained at these temperatures for at least thirty minutes. For *Tribolium confusum* larvae similar results were obtained as for the adult *Tribolium confusum*.

Microwave power from the magnetron 8 was found to be totally absorbed by the wheat grain 4 in the vicinity of the window 7 in the main section 1. The effective penetration depth of the microwave energy into the wheat grain 1 was found to be about four inches and so it was considered safe to assume that there was very little leakage of microwave power from the open ends of the main section 1.

In order to determine the effects of high frequency irradiation on the milling and baking qualities of wheat, three samples heated to 55° C., 65° C., and 80° C. where compared with an untreated or control sample. The results, which are given in the following table, indicate that there is no effect on the milling quality or the protein content of the wheat grain. However, the breadmaking quality was found to be affected deleteriously, and progressively more as the treatment temperature was increased. The effects noted are similar to those experienced by improper drying of grain.

MILLING AND BAKING QUALITIES OF HIGH-FREQUENCY-IRRADIATED WHEAT

| Property | Control sample | Sample temperature | | |
|---|---|---|---|---|
| | | 55° C. | 65° C. | 80° C. |
| Wheat: | | | | |
| Moisture, percent | 12.7 | 12.3 | 12.1 | 11.5 |
| Protein, percent | 9.8 | 9.8 | 9.8 | 9.8 |
| Flour yield, percent (total) | 74.9 | 74.4 | 74.0 | 74.0 |
| Flour: | | | | |
| Protein, percent | 9.3 | 9.3 | 9.3 | 9.3 |
| Colour units | −0.8 | −0.3 | −0.2 | 0.0 |
| Baking absorption, percent | 60.1 | 61.1 | 60.5 | 59.8 |
| Bread: Loaf volume, cc. (remix) | 550 | 435 | 360 | 315 |
| Farinogram: | | | | |
| Absorption, percent | 65.1 | 65.1 | 64.5 | 63.5 |
| Development time, min | 1.5 | 2.0 | 1.25 | 1.5 |

It is well known that storage difficulties and infestation of wheat by insects occur most frequently when the wheat grain has a relatively high moisture content. It is therefore advantageous to lower the moisture content in addition to destroying the insects to prevent spoilage of the wheat grain.

With the apparatus shown in FIG. 1 it was found that raising the temperature of the wheat grain 1 to 65° C. in the main section 1, with the circulation of warm air through the irradiated wheat grain 1, provides a very effective drying action. The small temperature gradient between the inside of the wheat kernels and the circulating air caused no significant scorching of the wheat grain 1. The drying action of the wheat grain 1 is from the inside of the grains towards the outsides. A part of the warm, drying air can conveniently be obtained from a cooling system for the magnetron 8, thus making maximum use of the power applied to it. Using the apparatus shown in FIG. 1 an experimental system to verify this was developed and several measurements were made. It was found that when wheat with a moisture content of 16.5 percent was passed through the apparatus and raised to a temperature of 65° C., and then subjected to a blast of air, the humidity was reduced to 13.3 percent. A second run was made in which the wheat temperature was raised to 55° C., and the moisture content was reduced from 16.5 percent to 13.8 percent. As mentioned previously, however, some reduction in the loaf volume of bread made from the wheat grain occurred, and this was found to be particularly significant when wheat grain with a high moisture content was raised to a high temperature.

In FIG. 2 there is shown an apparatus incorporating two stage drying for the wheat grain in order to improve the loaf volume of bread obtainable from irradiated wheat grain.

In FIG. 2 there is shown a main section waveguide 25 provided with a hopper 26. Two branch section waveguides 27 and 28 are jointed to the main section 25, and two windows 29 and 30 are shown partitioning the interiors of the branch sections 27 and 28 respectively, from the interior of the main section 25. The branch sections 27 and 28 are fitted with screw tuners 31 and 32 respectively. A secondary main section waveguide 33, in the form of a power distribution waveguide system, is joined at its output ends to the branch sections 27 and 28, and a secondary branch section waveguide 34 is jointed to the secondary main section 33. A magnetron 35 is connected to the input of the secondary branch section 34. The main section 25 is provided with a thermally insulated, wheat grain receiving box 36 at its lower end, and a flap valve 37 which is adjustable by a screw 38. The screw 38 is coupled to a wheat grain temperature regulating device 39 connected to two temperature sensing devices 40 and 41. Each dimension z is 18 inches.

The main section 25 has four wire mesh screens 42 to 45 forming portions of the side walls thereof. The screens 42 and 43 are connected by ducting 46 to a gas heated, warm air supply 47. The screens 44 and 45 are vented by ductings 48 and 49 respectively to atmosphere.

In operation the apparatus is arranged as shown and the valve 37 was opened so that wheat grain 50 was allowed to gravitate from the hopper 26 down the main section 1 as a filling therefor, and into the box 36. The magnetron 35 was energized and the screw tuners 31 and 32 adjusted to tune the apparatus. The valve 37 was then adjusted until the temperatures of the wheat grain 50 indicated by the temperature sensing devices 40 and 41 was 45° C. and 55° to 65° C. respectively. Warm air was passed from the supply 47 through the screens 42 to remove moisture from the heated wheat grain and emerge with the moisture from the ducts 48 to 49. The temperature regulated system 39 was then adjusted to operate the valve 37 so that the temperature sensing devices 40 and 41 indicated that the wheat grain temperatures at their positions remained fairly constant. The apparatus effectively deinfested the wheat grain 50 and removed moisture therefrom.

If desired two magnetrons may be used, each passing microwave energy to one of the branch sections 27 and 28.

In this specification vegetal substance is intended to include such food products as fish or meat extracts and compounds, vegetables, fruits, grain, corn, sugar and flour and like substances.

The apparatus of the invention is equally effective for insect and moisture control of rice, barley and many other foodstuffs and also insect control in flour.

We claim:

1. Apparatus for the deinfestation of vegetal substances, comprising a main section waveguide means for passing said substance along said main section as a filling therein, a branch section waveguide joined to said main section to form a junction therewith, a window partitioning the interior of said branch section from said main section to provide a passage through the interior of said main section for said substance, said window providing a substantially unobstructed path for microwave energy propagated along said branch section and into said main section, and means for generating microwave energy along said branch section and into said main section to heat said substance at said junction, when it is disposed within said main section, and a tuning device for minimising the voltage standing wave pattern to destroy infestation within said substance.

2. Apparatus according to claim 1, which includes means for passing a gas heated to at least 45° C., through the said heated substance to remove moisture therefrom.

3. Apparatus according to claim 2, wherein said branch section is a first heater for said substance below the deinfestation temperature, and a further branch section is provided connected to said main section for heating said substance to a temperature at which deinfestation occurs.

4. Apparttus according to claim 1, wherein said means for passing said substance along said main section comprises a hopper mounted above said main section, and a flap valve at the lower end of said main section.

5. Apparatus according to claim 4, comprising a temperature regulating device connected to said flap valve, temperature sensing devices disposed in said main section downstream of said branch section and connected to said device, whereby said device adjusts said flap valve to maintain the temperature of said substance at said temperature indicating means substantially constant.

6. Apparatus according to claim 1, wherein said branch section comprises a slotted line connected to the output of said means for generating microwave energy, and said tuning device connects said slotted line to said main section, whereby the voltage standing wave ratio in said slotted line may be adjustable to the minimum ratio obtainable.

References Cited
UNITED STATES PATENTS

| | | | |
|---|---|---|---|
| 1,972,050 | 8/1934 | Davis | 34—1 |
| 3,235,971 | 2/1966 | Tooby | 34—1 |
| 3,257,283 | 6/1966 | Hamberger | 219—10.55 |
| 3,505,490 | 4/1970 | Corn | 219—10.55 |

CHARLES SUKALO, Primary Examiner

U.S. Cl. X.R.

219—10.55